UNITED STATES PATENT OFFICE.

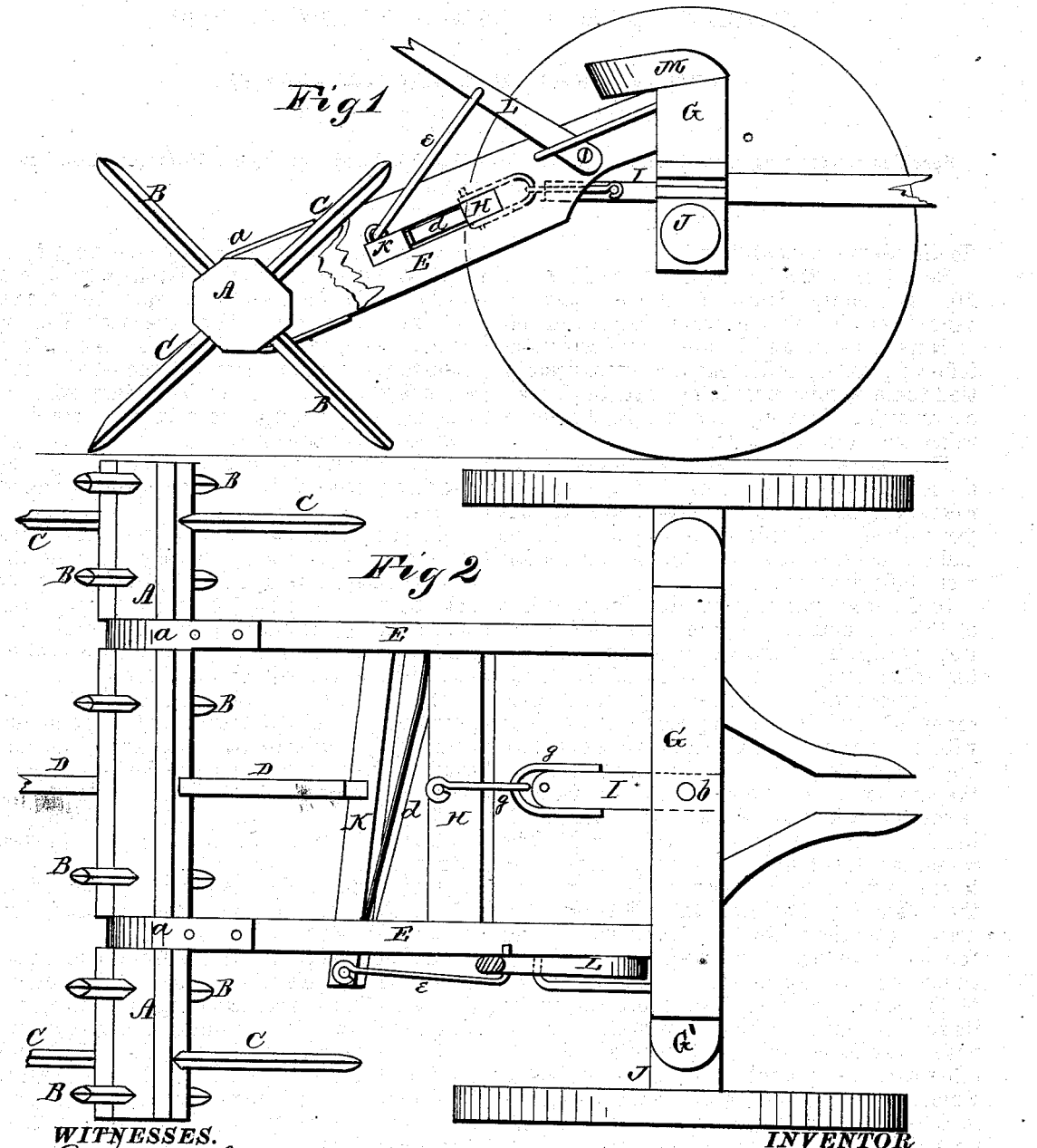

ASAHEL T. HAYS, OF McLEAN COUNTY, ILLINOIS.

IMPROVEMENT IN HORSE HAY-RAKES.

Specification forming part of Letters Patent No. 158,490, dated January 5, 1875; application filed April 16, 1874.

*To all whom it may concern:*

Be it known that I, ASAHEL T. HAYS, of McLean county, State of Illinois, have invented certain new and useful Improvements in Horse-Rakes; and I do hereby declare the following to be a full, clear, and exact description thereof, reference being had to the accompanying drawing, and to the letters of reference marked thereon.

The nature of my invention consists in the construction and arrangement of a horse hay-rake, designed to be an attachment to the front wheels and axle of a wagon, and thus make a mounted rake, as will be hereinafter more fully set forth.

In the accompanying drawing, forming part of this specification, Figure 1 is a side elevation, partly in longitudinal section, of my hay-rake. Fig. 2 is a plan view of the same.

A represents the rake-head, provided with series of teeth B B, on opposite sides; also with two turn-teeth, C C, near each end, standing at right angles with, and midway between, the two series of rake-teeth B. In the center of the rake-head A are latch-teeth D D, parallel with the turning-teeth C C. The rake-head A is hung in two strap-hinges, a a, to two arms, E E, connecting the rake with the bolster G. The two arms E E are connected near the center by a cross-bar, H, and this bar is connected to the king-bolt b, between the sand-board G and axle J, by means of the coupling-bar I. This coupling-bar, at its rear end, and the bar H, are each provided with a U-shaped link, g, which take into each other and form a double clevis, by means of which a flexible connection is made to accommodate the fore wheels of a wagon, no matter how thick or thin the sand-board may be. The coupling I is used to produce a center draft, and bring the bulk of the strain upon the axle, and relieve the bolster from the strain it would otherwise have.

In one of the arms E is hinged or pivoted a latch, K, the other end of which enters and moves in a mortise in the opposite arm, and is pressed toward the rear by a spring, d, so that either one of the two latch-teeth D will strike on the same and hold the rake from revolving. The outer end of the latch K is, by a rod, e, connected to a lever, L, which is pivoted to the outside of one of the side arms E, at such a point as to be within easy reach of the driver seated upon the seat M, attached on top of the bolster G.

This rake and attachment can be used on the fore wheels and axle of any ordinary farm-wagon.

The driver can, at proper intervals, draw the lever L forward, thereby moving the spring-latch K from the tooth D, allowing the rake to make one half of a revolution, and, when drawn forward again, allows another half-revolution, and so on, half a revolution at a time, at the will of the driver.

The end or turn-teeth C C are of great importance, as without them the rake would not complete half a revolution each time; but they catch in the ground and cause the rake to complete the half-revolution.

The teeth C C further operate to steady the rake, and prevent it from tipping toward either end.

Having thus fully described my invention, what I claim as new, and desire to secure by Letters Patent, is—

The combination, with the front axle, sand-board, and wheels of a wagon, of the bolster G, the inclined arms E E, rigidly connected to the bolster, the coupling I flexibly connected to the cross-bar H, and king-bolt b, and the rake-head A, provided with turn-teeth C C at each end, and turn-teeth D D at the center, all substantially as and for the purposes herein set forth.

In witness whereof 1 have hereto set my hand and seal this 3d day of March, 1874.

ASAHEL T. HAYS. [L. S.]

Witnesses:
 THOS. SLADE,
 CHAS. B. SLADE.